United States Patent [19]
Fukazawa

[11] 3,882,249
[45] May 6, 1975

[54] METHOD FOR THE DEODORIZATION AND BLOOD-REMOVAL OF MEATS AND FISH EGGS

[75] Inventor: Ryutaro Fukazawa, Tokyo, Japan

[73] Assignee: Sankyo Company Limited, Tokyo, Japan

[22] Filed: June 28, 1973

[21] Appl. No.: 374,418

[30] Foreign Application Priority Data
July 27, 1972  Japan.............................. 47-75260

[52] U.S. Cl. ...................... 426/7; 426/32; 426/47; 426/56
[51] Int. Cl.................... A22c 18/00; A22c 25/00
[58] Field of Search ............ 426/7, 47, 56, 59, 265, 426/32

[56] References Cited
UNITED STATES PATENTS

| | | | |
|---|---|---|---|
| 3,170,794 | 2/1965 | Jeffreys et al............................ | 426/7 |
| 3,260,606 | 7/1966 | Azuma.................................. | 426/47 |
| 3,477,859 | 11/1969 | Brown et al. ........................ | 426/265 |

*Primary Examiner*—Hyman Lord
*Attorney, Agent, or Firm*—Flynn & Frishauf

[57] ABSTRACT

Improved method for the deodorization and blood-removal of flesh meats, marine animal meats and fish eggs which comprises treating raw flesh meats, raw marine animal meats or raw fish eggs by the immersion into an aqueous solution containing lipase and a water-soluble salt of citric acid.

8 Claims, No Drawings

METHOD FOR THE DEODORIZATION AND BLOOD-REMOVAL OF MEATS AND FISH EGGS

This invention relates to an improvement in quality of meats and fish eggs.

More particularly, it is concerned with a method for the deodorization and blood-removal of flesh meat, marine animal meat and fish egg which comprises treating a raw flesh meat, a raw marine animal meat or a raw fish egg by immersing said meat or egg into an aqueous solution containing lipase and a water-soluble salt of citric acid.

The term "flesh meat" as used herein means to include edible flesh meats, e.g., pork, mutton, lamb, horseflesh and the like. The term "marine animal meat" as used herein means to include edible marine animals meats, e.g., those of black whale, sperm whale, humpback whale, steepletop, sulfur bottom, killer whale, dolphin and the like. The term "fish egg" as used herein means to include edible fish eggs, e.g., roes of herring, cod, salmon, flatfish, "Mutsu" (*Scombrops boops*) and the like.

Flesh meats and fish eggs are known to have an offensive odor and to be blood-stained and the processed products made by the use of these meats and eggs as raw materials are also badly affected in their qualities.

Heretofore, a method for the deodorization and blood-removal of such raw meats or fish eggs by bleaching with water or immersing said meat or egg into an aqueous solution of a phosphate or an aqueous solution of hydrogen peroxide, has been proposed in the art. However, a satisfactory effect has not been achieved due to less effectiveness or the need for time-consuming and laborious work.

As a result of my extensive study on the deodorization and blood-removal of meats and fish eggs, it has been found that deodorization and blood-removal of raw flesh meats, marine animal meats or fish eggs can be far more effectively accomplished by immersing them into an aqueous solution containing lipase and a water-soluble salt of citric acid, as compared with the prior art method.

It is, accordingly, a primary object of this invention to provide an improved and more advantageous method for the deodorization and blood-removal of raw flesh meats, marine animal meats and fish eggs.

Other objects and advantages of this invention will be apparent from the following description.

According to the method of this invention, the meats or fish eggs can be advantageously deodorized and blood-removed by a simple procedure which comprises immersing them into an aqueous solution containing lipase and a water-soluble salt of citric acid. The period of time for the immersion may be varied depending on the sort, size and volume of the raw material to be treated, the content of each effective ingredient in the treating solution and other factors, but it is usually for about 0.5 – 6 hours. The potency of lipase in the treating solution is usually in the range of $1 \times 10^3$ to $1 \times 10^5$ units/l., but lower or higher content may also be favourably utilized. Enzyme unit of the lipase is determined by the modification of the method reported by K. Yamada et al. in the Journal of the Agricultural Chemical Society of Japan, 36, 860, (1962), (Part 2). The water-soluble salt of citric acid which may be employed in this method may be any of those salts that are soluble in water and do not adversely affect the quality, taste and the like of raw material. Example of such water-soluble salts of citric acid includes sodium citrate, potassium citrate and ammonium citrate and sodium citrate is preferable. The concentration of the water-soluble salt in the treating solution is usually in the range of about 0.5 to 3.0 %. An exhausted treating solution may be, if desired, refreshed by the addition of fresh lipase and/or water-soluble salt of citric acid and repeatedly employed in this method. In order to accomplish a more improved effect of this invention, to the treating solution may be added an emulsifying agent, e.g., sucrose fatty acid esters or sorbitan fatty acid esters and a mineral acid in a calcium salt form, e.g., calcium dihydrogen phosphate and other known additives commonly employed for processing meats or fish eggs.

According to the method of this invention, it can be effected by a simple treatment procedure to make a rapid blood-removal through the combined action of lipase and the water-soluble salt of citric acid and further to solubilize and remove nitrogenous compounds, such as aldehydes, ketones, fatty acids and alkylamines, piperidine, indole, ammonia or the like or sulfur-containing compounds, such as methyl mercaptan and the like, the compounds of which are such substances that are in blood or fats and oils and responsible for offensive odor. The flesh meats, marine animal meats and fish eggs treated according to the method of this invention also show a highly improved color tone by more effective removal of blood and a highly deodorized level of offensive odor including irritating smell, fishy smell, rancid smell, spoiled cabbage smell or the like.

Then, the following examples are given for the purpose of illustrating the method of this invention.

EXAMPLE 1

Into 1 l. of an aqueous solution of lipase and sodium citrate in amounts indicated in Table I below was immersed 1 kg. of sliced bacon portions of pork for 30 minutes and the meat slices were drawn out from the solution and drained.

A control was prepared by immersing the slices into a tap water containing neither lipase nor sodium citrate for 30 minutes.

Each portion of these slices was sampled and the sample was tested on its odor and color tone by organoleptic examination.

The remainder of the slice was immediately freeze-dried in a conventional manner and the freeze-dried slice was again tested on its odor and color tone by organoleptic examination.

The results are given in the following Table I.

Table I

| Sample No. | Lipase (unit/l.) | Na citrate (g/l.) | Immediately after treatment | | After freeze-drying | |
|---|---|---|---|---|---|---|
| | | | Color tone | Odor | Color tone | Odor |
| 1 | $1 \times 10^4$ | 10 | Pale crimson | + | Pale crimson | + |
| 2 | $2 \times 10^4$ | 10 | " | − | " | − |
| 3 | $4 \times 10^4$ | 10 | " | − | " | − |

Table I – Continued

| Sample No. | Lipase (unit/l.) | Na citrate (g/l.) | Immediately after treatment | | After freeze-drying | |
|---|---|---|---|---|---|---|
| | | | Color tone | Odor | Color tone | Odor |
| 4 | $6 \times 10^4$ | 10 | " | – | " | – |
| 5 | $8 \times 10^4$ | 10 | " | – | " | – |
| 6 | $1 \times 10^5$ | 10 | " | – | " | – |
| non-treated | – | – | Pale red | + | Dark red | ++ |

As is apparent from the above-given results, it is noted that the method of this invention provides bacon portions of pork which are free of a peculiar odor emitted with their storage under a freeze-dried condition and have a satisfactory color tone. Also, there are provided bacon portions of pork with a good quality due to the removal of excess fatty matters.

EXAMPLE 2

Into 1 l. of an aqueous solution of lipase and sodium citrate in amounts indicated in Table II below was immersed 1 kg. of sliced meats of sperm whale for 6 hours and the meat slices were drawn out from the solution and drained.

A control was prepared by immersing the slices into a tap water containing neither lipase nor sodium citrate for 6 hours.

These slices were tested on their odor and color tone in the same manner as given in Example 1.

The results are given in the following Table II.

Table II

| Sample No. | Lipase (unit/l.) | Na citrate (g./l.) | Color tone | Odor |
|---|---|---|---|---|
| 1 | $1 \times 10^4$ | 20 | Pale crimson | – |
| 2 | $3 \times 10^4$ | 20 | " | – |
| 3 | $5 \times 10^4$ | 20 | " | – |
| 4 | $1 \times 10^5$ | 20 | " | – |
| non-treated | – | – | Black | +++ |

It is noted from the above-given results that the meats of sperm whale in the control are dark-colored due to full-bloodedness and heavy odor, whereas the treated whale meats become pale crimson-colored as if they look like a quite different sort of meat and also completely free of odor.

EXAMPLE 3

Into 1 l. of an aqueous solution of lipase and sodium citrate in amounts indicated in Table III below was immersed 500 g. of herring-roe just isolated from the peritoneal cavity of herring fish for 6 hours and the roe was drawn out from the solution. Then, the color tone and odor of the treated roe were examined in the same manner as given in Example 1.

Control A was prepared by immersing raw herring roe into a tap water for 6 hours and Control B was prepared by immersing the roe into an aqueous solution containing 0.1 % of hydrogen peroxide for 6 hours.

The results are given in the following Table III.

Table III

| Sample No. | Lipase (unit/l.) | Na citrate (g./l.) | Color tone | Odor |
|---|---|---|---|---|
| 1 | $1 \times 10^3$ | 20 | Pale yellow | – |
| 2 | $5 \times 10^3$ | 20 | " | – |
| 3 | $1 \times 10^4$ | 20 | " | – |
| Control A | – | – | Pale crimson | + |
| Control B | – | – | " | + |

It is noted from the above results that the control roes have some blood left on their surface and between egg membranes together with a fishy smell inherent in fish eggs, whereas the treated roes are pale yellow-colored in their tone and free of fishy smell.

What is claimed is:

1. A method for the deodorization and blood-removal of flesh meat, marine animal meat and fish egg which comprises treating a raw flesh meat, a raw marine animal meat or a raw fish egg by immersing said meat or egg into an aqueous solution containing lipase and a water-soluble salt of citric acid, wherein the concentration of said lipase in said solution is from $1 \times 10^3$ to $1 \times 10^5$ units per liter of said solution and the concentration of said water-soluble salt is from 0.5 to 3.0 in said solution said period of time for the immersion being from about 0.5 to about 6 hours.

2. The method according to claim 1 wherein said water-soluble salt is sodium citrate.

3. The method according to claim 1 wherein said raw flesh is selected from the group consisting of pork, mutton and horseflesh.

4. The method according to claim 1 wherein said marine animal meat is selected from the group consisting of meats of black whale, sperm whale, humpback whale, sulfur bottom, killer whale and dolphin.

5. The method according to claim 1 wherein said fish egg is selected from the group consisting of roes of herring, cod, flatfish and *Scombrops boops*.

6. The method according to claim 1 wherein said flesh meat is pork.

7. The method according to claim 1 wherein said marine animal meat is whale meat of sperm whale.

8. The method according to claim 1 wherein said fish egg is herring-roe.

* * * * *